(12) United States Patent
Lesesky et al.

(10) Patent No.: US 6,533,465 B1
(45) Date of Patent: Mar. 18, 2003

(54) MODULAR CONNECTOR

(75) Inventors: Alan C. Lesesky, Charlotte, NC (US); David J. Lee, York, SC (US); Wally V. Stegall, Lancaster, SC (US); Brian M. Lesesky, Charlotte, NC (US)

(73) Assignee: Vehicle Enhancement Systems, Inc., Rock Hill, SC (US)

( * ) Notice: Subject to any disclaimer, the term of this patent is extended or adjusted under 35 U.S.C. 154(b) by 0 days.

(21) Appl. No.: 09/302,581

(22) Filed: Apr. 30, 1999

Related U.S. Application Data

(60) Provisional application No. 60/083,770, filed on May 1, 1998.

(51) Int. Cl.[7] .................................................. G02B 6/38
(52) U.S. Cl. .................................................. 385/75; 385/66
(58) Field of Search ............................ 385/55, 56, 59, 385/60, 75, 101, 62, 63, 66, 72, 78, 76, 77, 83–84, 88, 89, 90–92, 94

(56) References Cited

U.S. PATENT DOCUMENTS

| | | | |
|---|---|---|---|
| 4,808,115 A | | 2/1989 | Norton et al. |
| 5,091,987 A | * | 2/1992 | MacCulloch et al. |
| 5,140,659 A | * | 8/1992 | Minds et al. |
| 5,195,904 A | | 3/1993 | Cyvoct |
| 5,302,141 A | | 4/1994 | O'Reilly et al. |
| 5,529,513 A | | 6/1996 | Lee |
| 5,574,815 A | * | 11/1996 | Kneeland |
| 5,641,306 A | | 6/1997 | Stepniak |
| 5,743,763 A | | 4/1998 | Giovanni |
| 5,812,728 A | * | 9/1998 | Wanamaker |

FOREIGN PATENT DOCUMENTS

| | | |
|---|---|---|
| EP | 0 251 655 A1 | 1/1988 |
| EP | 0 430 107 A2 | 6/1991 |
| EP | 0 655 804 A2 | 5/1995 |
| EP | 0 713 111 A1 | 5/1996 |
| EP | 0 727 845 A2 | 8/1996 |

OTHER PUBLICATIONS

International Search Report, PCT/US99/09553; Aug. 20, 1999.

* cited by examiner

Primary Examiner—Frank G. Font
Assistant Examiner—Michael P. Mooney
(74) Attorney, Agent, or Firm—Alston & Bird LLP (57) ABSTRACT

The modular connector includes a replaceable first cartridge having at least one communication terminal. The at least one communication terminal of the first cartridge can be electrically conductive and, in some instances, optically transmissive and has first and second opposed ends, wherein the first end is adapted to transmit a communication signal to a receptacle. The modular connector includes a second cartridge having at least one communication terminal defining first and second receptors. The at least one communication terminal of the second cartridge can be electrically conductive and, in some instances, optically transmissive. The first receptor of the at least one communication terminal of the second cartridge is adapted to receive a communication member, such as wire and, in some instances, an optical fiber. The second receptor of the at least one communication terminal of the second cartridge is adapted to releasably engage one end of the at least one communication terminal of the replaceable first cartridge. The first and second cartridges are adapted to be selectively mated and demated such that the first cartridge can be easily and efficiently replaced.

35 Claims, 6 Drawing Sheets

MODULAR CONNECTOR

Cross-Reference to Related Applications

This application claims the benefit of U.S. Provisional Application Ser. No. 60/083,770, filed May 1, 1998, under 35 U.S.C. § 119(e)(1).

FIELD OF THE INVENTION

The present invention relates to electrical connectors and, more particularly, relates to modular electrical connectors.

BACKGROUND OF THE INVENTION

Conventional electrical connectors are used in a variety of applications. For example, electrical connectors are used in the transportation industry for electrical communication between a tractor and a trailer to activate the brake and turn signals, the auxiliary lighting, as well as to monitor and control the environmental control apparatus of the trailer.

For example, a seven-pin connector has been widely used by the trucking industry to convey electrical power for lighting and equipment operation between a tractor and a trailer. A seven-pin connector includes two disengageable connector portions to permit the tractor and trailer combination to be disconnected. An example of such a seven-pin connector is illustrated in U.S.

Pat. No. 4,969,839 to Nilsson, the entire disclosure of which is specifically incorporated herein by reference. These seven-pin connectors are well known and have been specified by the Society of Automotive Engineering (SAE), according to the standard number "SAE J560", the teachings of which are also incorporated herein by reference.

Figure 1:
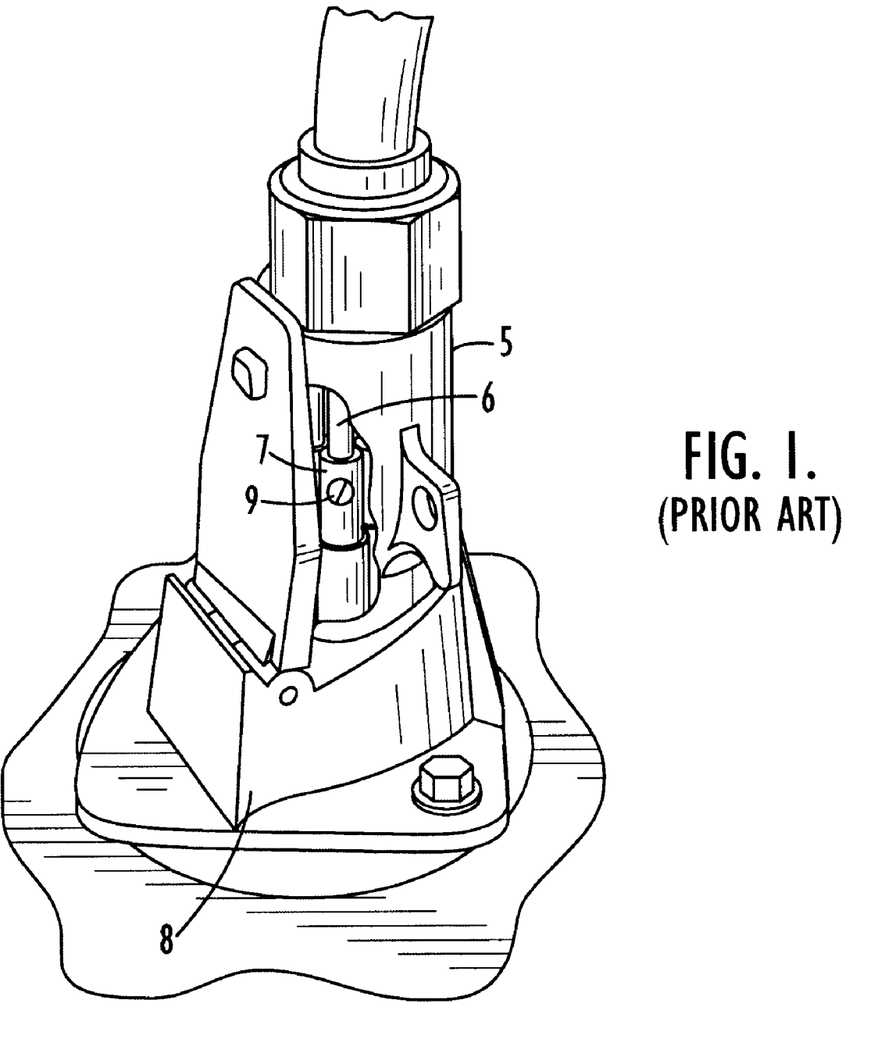
FIG. 1 is a perspective view illustrating a prior art seven-pin connector.

Conventional connectors, such as seven-pin connectors, one of which is illustrated in FIG. 1, include either a male or female connector 5 which has one or more terminals 7 connected to one or more wires 6 and that accept a corresponding pin of a receptacle 8. The wire or wires are commonly secured to the terminal using set screws 9. Disadvantageously, frequent connection and disconnection of conventional connectors 5 to and from receptacles 8 can loosen the fit of the pins of the receptacle with the corresponding terminals 7 and can result in a decrease in the pressure exerted by the terminals on the pins of the receptacle. To replace or service the connectors 5 often times requires detachment from the wires 6, including loosening and then re-tightening of the set screws 9. Over time, repeated adjustment of the set screws 9 can result in the set screws penetrating and damaging the corresponding wire 6, which can disrupt electrical communications. In addition, vibration and environmental conditions can also result in a decrease in the pressure exerted by the set screws 9 on the corresponding wire such that the wire 6 can become dislodged from the terminal 7. As a result of these problems, conventional connectors can be unreliable and require frequent maintenance, which can be expensive over the life of the connector. With respect to the seven-pin connector used by the trucking industry, these problems are typically exacerbated by the relatively frequent connection and disconnection of the seven-pin connectors.

SUMMARY OF THE INVENTION

The present invention provides a modular connector that is particularly well suited to a number of applications, including applications in the transportation industry currently serviced by conventional seven-pin connectors. The modular connector preferably includes a replaceable first cartridge having at least one communication terminal. The at least one communication terminal of the replaceable first cartridge can be electrically conductive and, in some instances, optically transmissive. The at least one communication terminal of the first cartridge may define first and second opposed ends, wherein the first end of the at least one communication terminal of the first cartridge is adapted to transmit a communication signal to the receptacle. The first end of the at least one communication terminal of the replaceable first cartridge can be cryogenically tempered.

The modular connector also includes a second cartridge having at least one communication terminal defining first and second receptors. The at least one communication terminal of the second cartridge can be electrically conductive and, in some instances, optically transmissive. The first receptor of the at least one communication terminal of the second cartridge is adapted to receive a communication member, such as wire and, in some instances, an optical fiber. The second receptor of the at least one communication terminal of the second cartridge is adapted to releasably engage the second end of the at least one communication terminal of the replaceable first cartridge. As such, the first and second cartridges are adapted to be selectively mated and demated so that the first cartridge can be replaced when necessary.

The second cartridge can include at least one cable seal adapted to sealably engage the first receptor of the at least one communication terminal of the second cartridge. The modular connector can also include a locking member for securing a communication member to the first receptor of the at least one communication terminal of the second cartridge. The second cartridge can include a housing for housing the at least one communication member. The housing may have a removable door for servicing the at least one communication terminal of the second cartridge. The replaceable first cartridge and second cartridge can include optically transmissive frames comprised of a material selected from a group consisting of a translucent material and a transparent material such that an optical signal can be transmitted through the optically transmissive frames of the replaceable first cartridge and second cartridge to a receptacle.

The modular connector can also include an outer member having first and second ends and defining an opening therethrough. The first end of the outer member is adapted to releasably receive at least a portion of the second cartridge. The second end of the outer member is adapted to releasably receive at least a portion of the replaceable first cartridge so that the replaceable first cartridge can be replaced. The modular connector preferably includes at least one multi-ribbed seal adapted to sealably engage at least a portion of the exterior surface of the replaceable first cartridge and the interior surface of the outer member and a multi-ribbed seal adapted to sealably engage at least a portion of the exterior surface of the second cartridge and the interior surface of the outer member. The modular connector can also include a strain-reduction member removably attached to the outer member and defining an opening therethrough adapted to receive and urge a communication member toward the at least one communication terminal of the second cartridge. Preferably, the outer member defines a removable door for servicing the second cartridge.

According to one advantageous embodiment of the present invention, the connector provides both electrical and optical signals to a receptacle. The connector of this embodiment includes a cartridge having at least one conductive terminal. The conductive terminal defines first and second receptors. The first receptor of the at least one conductive terminal is adapted to receive an electrical communicating member, such as a wire. The second receptor of the at least one conductive terminal is adapted to receive a conductive element of a receptacle, such as a blade or pin. The cartridge also includes at least one optical channel having opposed receiving and transmitting ends. The receiving end of the at least one optical channel is adapted to receive optical signals from an optical communicating member, such as an optical fiber. The transmitting end of the at least one optical channel is adapted to optically transmit an optical signal to the receptacle. While the optical channel can be comprised of an optical fiber, the cartridge can also include an optically transmissive frame comprised of a material selected from a group consisting of a translucent material and a transparent material such that an optical signal can be transmitted through the optically transmissive frame itself to the receptacle.

The modular connector of the present invention can therefore be readily configured to mate with various receptacles capable of supporting electrical and/or optical communications. The replaceable first cartridge also enables efficient repair and servicing of the modular connector without affecting the connections between the second cartridge and the electrical communicating member and/or the optical communicating member. As such, the wear and tear that occurs as the connector of the present invention is repeatedly connected and disconnected can be eliminated by periodically replacing the first cartridge, which is the cartridge that directly mates with the receptacle. Since the second cartridge, but not the first cartridge, is directly connected to the communicating members, such as the wires and/or optical fibers, the first cartridge can be easily replaced without disrupting or having to reconnect the communicating members. Since the connector is modular, the connector can easily adapt to a variety of other applications as described hereinafter.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and wherein.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout.

Figure 2:
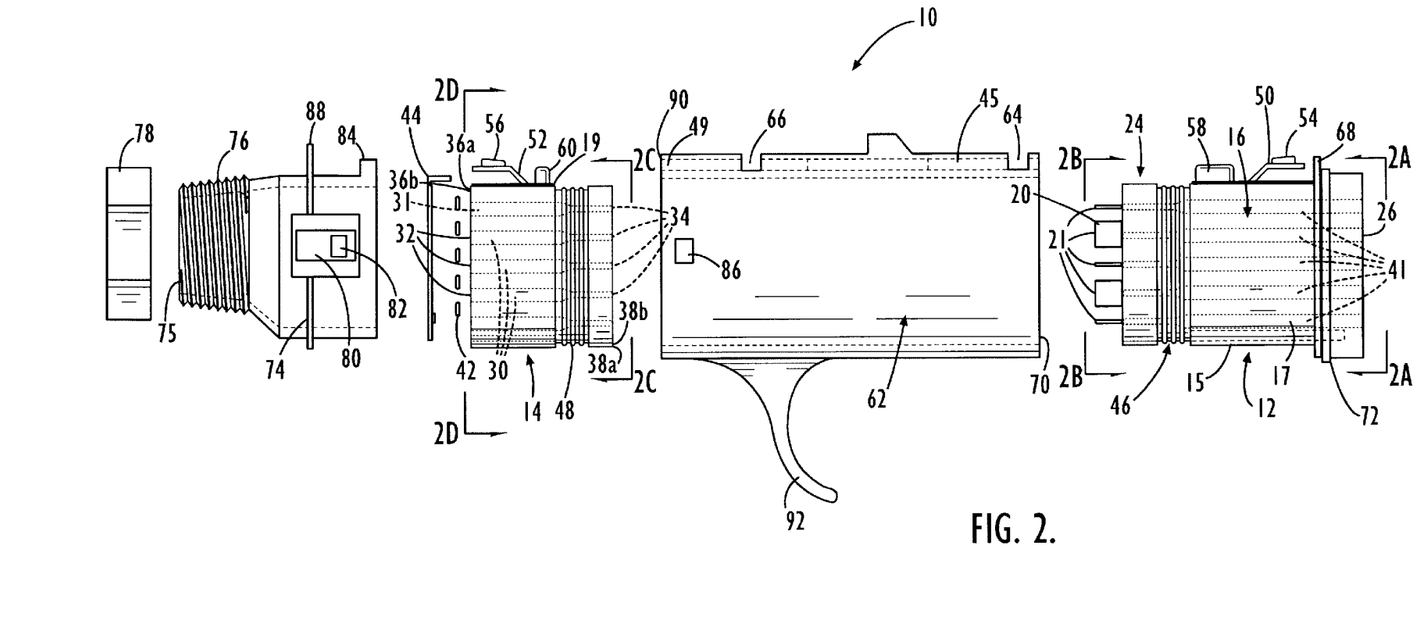
FIG. 2 is an exploded view illustrating a preferred embodiment of the modular connector according to one embodiment of the present invention.
Figure 3:
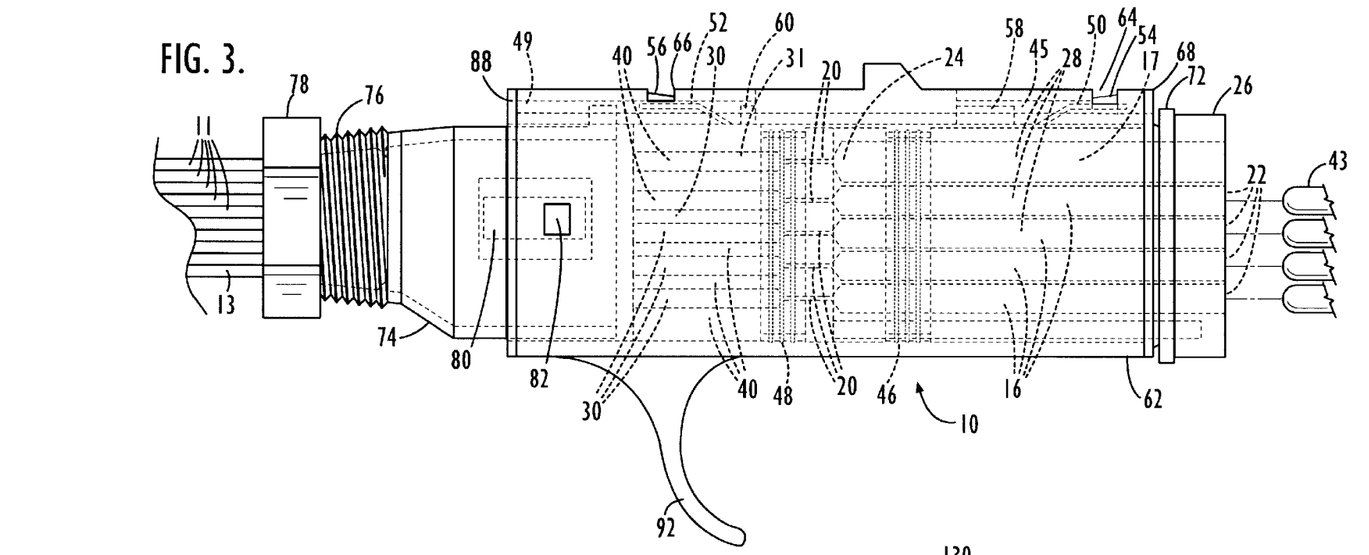
FIG. 3 a side view further illustrating the embodiment of the modular connector of FIG. 2.

Referring now to the drawings and, in particular, to FIGS. 2 and 3, there is shown a modular connector 10 for establishing electrical and, in some instances, optical communications between one or more electrical communicating members 11 and, in some instances, one or more optical communicating members 13, respectively, and a receptacle. As is well known in the art, the electrical communicating members 11 may include a wire or other conductor having a conducting filament encased in a protective nonconductive insulating jacket. The optical communicating members 13 may include optical fibers. In addition, the receptacle generally includes conductive elements 43, such as one or more electrical pins or blades and, in some instances, one or more optical ports that are connected to the electrical and optical communicating members by the connectors of the present invention.

In a preferred embodiment, the modular connector 10 includes first and second mating members or cartridges 12, 14. The first cartridge 12 is a replaceable male terminal including a frame 15 and one or more communication terminals 41. The communication terminals 41 can include conductive terminals 16, which can be constructed of brass or another conducting material, and, according to one embodiment in which the connector 10 also supports optical communications, can also include optical channels 17, such as one or more optical fibers or one or more lenses, for coupling optical signals between the opposed ends of the first cartridge 12. The frame 15 may be molded of a hard durable plastic. The frame 15 is preferably constructed of material having a durometer equivalent to hard rubber so that the conductive terminals 16 and optical channels 17 can be insert molded. In one preferred embodiment, the frame 15 is constructed of an optically transmissive material. For example, the frame 15 of this embodiment is preferably formed of a material selected from the group consisting of a translucent material and a transparent material, such as clear polycarbonate or another optically transmissive plastic or glass, to enable an optical signal to be transmitted through the optically transmissive frame of the replaceable first cartridge 12 to a receptacle.

Figure 2A:
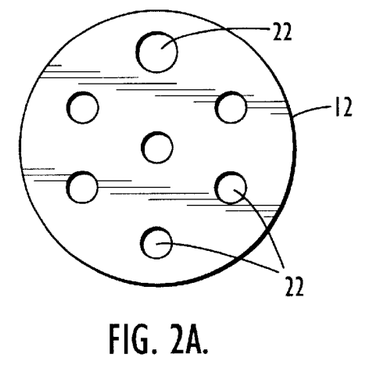
FIGS. 2A–2E are opposed end views illustrating the replaceable first cartridge and second cartridge of the modular connector according to one embodiment of the present invention.
Figure 2B:
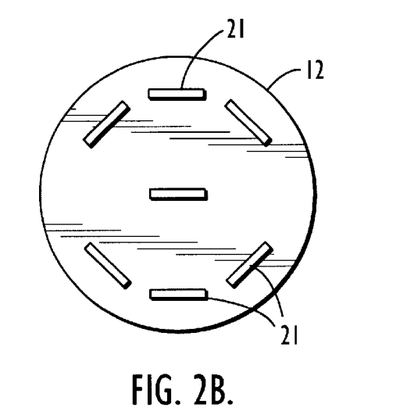

Each conductive terminal 16 of the first cartridge 12 includes a conductor 20, typically a blade-like conductor 21, such as a Packard® terminal, disposed at one end of the first cartridge and a corresponding receptor 22, such as a conductive tube or a Packard® terminal, disposed at the opposite end of the first cartridge. As a result, the end of the first cartridge 12 at which one or more conductors 20 are located is termed the conductor end 24, while the end of the first cartridge at which the one or more receptors 22 are located is termed the receiving end 26. The conductor 20 of each conductive terminal 16 is in electrical communication with the corresponding receptor 22 through the portion of the conductive terminal 16 extending between the conductor and receptor. As illustrated in FIG. 2B, the conductors 20 are typically bladed terminals 21. As is illustrated in FIG. 2A, each receptor 22 preferably defines a circular or elliptical cross-sectional shape to securely receive a conductive element 43 of a receptacle, such as a pin. The receptors 22 may be constructed of brass or another conductive material and may be split to allow for expansion. The brass receptors 22 are preferably cryogenically tempered by reducing the temperature to −300° C. for approximately thirty-six hours and then gradually returned to ambient temperature over a pre-selected time and temperature schedule. The durability of a cryogenically tempered brass receptor 22 is estimated to be approximately two to three times greater than a brass receptor that has not been cryogenically tempered.

The optional optical channels 17 of the first cartridge 12 can include optically transmissive tubes or fibers constructed of a clear polycarbonate or another optically transmissive plastic or glass. In addition to or instead of the optically transmissive tubes, the optical channels 17 of the first cartridge 12 can include one or more lens (not shown) for focusing and transmitting the optical signals from the conductor end 24 of the first cartridge to the receiving end 26. Alternatively, in embodiments in which the frame 15 of the first cartridge 12 is formed of an optically transmissive material, the frame itself can serve as the optical channel through which optical signals are transmitted.

As shown in FIGS. 2 and 3, the second cartridge 14 is a female terminal including a frame 19 and one or more communication terminals 51. The communication terminals 51 can include conductive terminals 30, which can be constructed of brass or another conducting material, and, according to one embodiment in which the connector 10 also supports optical communications, can also include optical channels 31, such as one or more optical fibers or one or more lenses, for coupling optical signals between the opposed ends of the second cartridge 14. The frame 19 may be fabricated or molded of a hard durable plastic. As with the frame 15 of the first cartridge 12, the frame 19 of the second cartridge 14 is preferably constructed of material having a durometer equivalent to hard rubber so that the conductive terminals 30 and optical channels 31 can be insert molded. In one preferred embodiment, the frame 19 is constructed of an optically transmissive material. For example, the frame 19 of this embodiment is preferably formed of a material selected from the group consisting of a translucent material and a transparent material, such as clear polycarbonate or another optically transmissive plastic or glass, to enable an optical signal to be transmitted through the optically transmissive frame of the second cartridge 14.

Figure 2C:
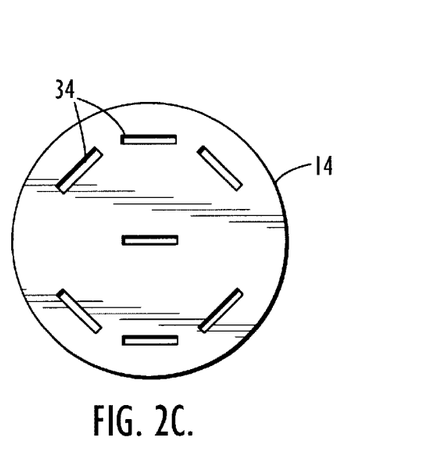
Figure 2D:
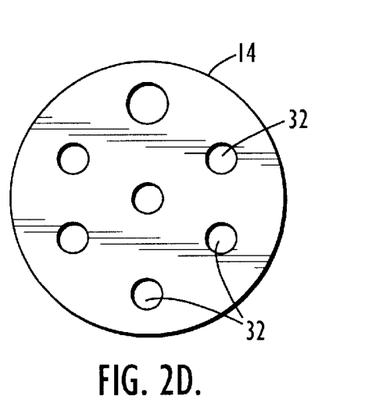

As shown in FIG. 2, each conductive terminal 30 of the second cartridge 14 includes a pair of receptors 32, 34 disposed at opposite ends of the second cartridge 14, hereinafter referred to as the first and second receiving ends 36a, 38a. Each of the receptors 32 of the first receiving end 36a are configured to securely receive the terminal end (not shown) of a corresponding electrical communicating member 11. As illustrated in FIG. 2D, each receptor 32 of the first receiving end 36a is preferably configured to have a cross-sectional shape of a circle or ellipse. In contrast, as illustrated in FIG. 2C, each of the receptors 34 of the second receiving end 38a is configured to securely receive a corresponding conductor 20 of the conductor end 24 of the replaceable first cartridge 12. As shown in FIG. 2C, for example, the receptors 34 of the second receiving end 38a are preferably configured to securely receive the bladed terminals 21 illustrated in FIG. 2B. In an alternate embodiment (not shown), the conductors 20 of the first cartridge 12 can be circular or elliptical pins and the receptors 34 of the second cartridge 14 can be configured to define a circular or elliptical cross-sectional shape to securely receive the pin or conductor of the first cartridge. The corresponding receptors 32, 34 of the first and second receiving ends 36a, 38a are in electrical communication through the portions of the conductive terminals 30 extending between the corresponding receptors 32, 34. The receptors 32 of the first receiving end 36a may be constructed of brass or another conducting material and may be split to allow for expansion. As may be done with the brass receptors 22 of the receiving end 26 of the first cartridge 12, the brass receptors 34 of the second receiving end 38a of the second cartridge 14 are preferably cryogenically tempered by reducing the temperature to −300° C. for approximately thirty-six hours and then gradually returned to ambient temperature over a pre-selected time and temperature schedule to improve the durability of the receptors.

The optional optical channels 31 of the second cartridge 14 preferably include optically transmissive tubes or fibers constructed of a clear polycarbonate or other optically transmissive plastic or glass. In addition to or instead of optically transmissive tubes or fibers, the optical channels 31 of the second cartridge 14 can include one or more lens (not shown) for focusing and transmitting the optical signals between opposed receiving and transmitting ends 36b, 38b of the second cartridge. The receiving end 36b of the optical channels 31 is adapted to receive an optical signal from an optical communicating member 13. The transmitting end 38b of the optical channels 31 is adapted to transmit an optical signal via a corresponding optical channel of the first cartridge to the receptacle. Alternatively, in embodiments in which the frame 19 of the second cartridge 14 is formed of an optically transmissive material, the frame itself can serve as the optical channel through which optical signals are transmitted.

In the preferred embodiment illustrated in FIGS. 2, and 3, the first and second cartridges 12, 14 each include seven conducting terminals 16, 30 and at least one, and preferably two or more optical channels 17, 31. In the alternate embodiment illustrated in FIG. 2E, the first and second cartridges include three optical channels 17, 31. The number of conducting terminals 16, 30 and optical channels 17, 31 may vary depending on the communication requirements of the specific application.

Referring to FIGS. 2 and 3, in a preferred embodiment, the electrical communicating members 11 (hereinafter "wires") are secured within the receptors 32 of the first receiving end 36a of the second cartridge 14 by first positioning a primary seal 42, such as a Packard® cable seal, around the terminal end of each of the wires and pressure crimping the primary seal around each wire. The primary seal 42 is constructed of silicon and preferably includes one or more ribs to prevent moisture from entering the second cartridge 14. In a preferred embodiment, the primary seal 42 includes three ribs. Next, the terminal end of each of the wires 11 is positioned within the corresponding receptor 32 of the first receiving end 36a of the second cartridge 14 and the receptor is permanently crimped around the corresponding wire. The receptor 32 is preferably constructed of copper or another conductive material. The optical communicating members 13 (hereinafter "optical fibers") are similarly attached as is known in the art.

In a preferred embodiment, as illustrated in FIG. 2, each of the wires 11 is inserted through a slot in a comb-like locking member 44, such as a Packard® secondary lock, prior to positioning and crimping the primary seal 42. Once the receptors 32 of the first receiving end 36 of the second cartridge 14 are permanently crimped around the terminal ends of each of the wires 11 and/or optical fibers 13 and the primary seals 42 have been mounted upon the wires and/or optical fibers, the locking member 44 is slid along the wires and/or optical fibers to a position adjacent the first receiving end 36 of the second cartridge and rearward of the primary seals. The locking member 44 stabilizes the receptors 32 under high current and temperature, and during extreme vibration, as well as urges the wires 11 and/or optical fibers 13 towards the first receiving end 36 of the second cartridge 14. In a preferred embodiment, the locking member 44 is constructed of stainless steel, however, the locking member may be constructed of any material having relatively high strength and stiffness.

Figure 7:
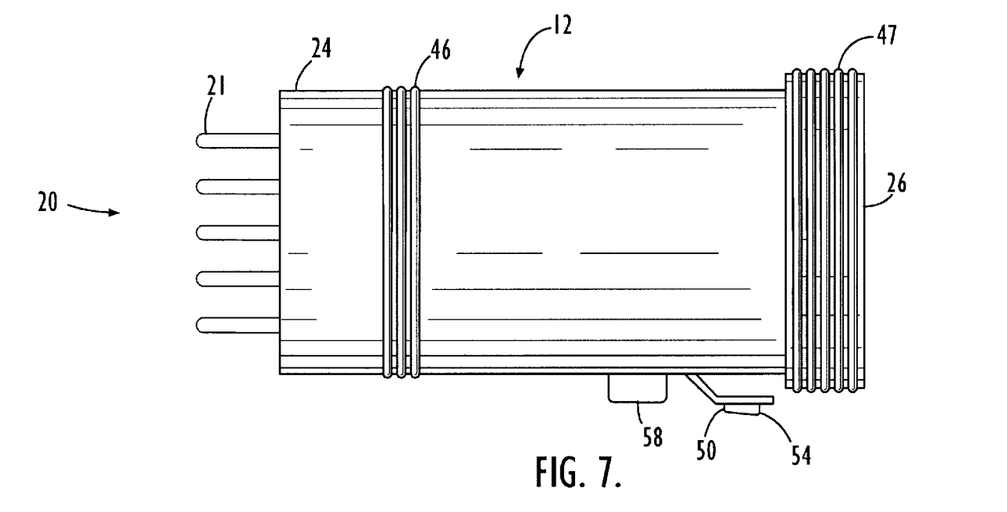
FIG. 7 is a side view illustrating an alternate embodiment of the first cartridge of the FIG. 2.

As shown in FIG. 2, the conductor end 24 of the first cartridge 12 and the second receiving end 38 of the second cartridge 14 preferably include corresponding secondary seals 46, 48. In a preferred embodiment, the secondary seals are highly durable multi-ribbed nose seals, such as a Packard® connector seal, that may be molded to the corresponding frames 15, 19 of the first and second cartridges 12, 14, respectively. The secondary seals 46, 48 may contain a small notch in the base of the seal to allow the corresponding cartridge 12, 14 to drain and breathe. In an alternate embodiment, as illustrated in FIG. 7, the first cartridge includes an additional secondary seal 47 molded to the receiving end 26 of the first cartridge 12, which may also include a small notch or groove in the base of the seal to allow the first cartridge to drain and breathe.

In another embodiment (not shown), the first cartridge 12 can also include multi-ribbed facial seals along the exterior portion of the front face of the frame 15 at the receiving end 26 of the first cartridge to prevent moisture from entering between the first cartridge and the receptacle. In addition, the individual receptors 22 of the receiving end 26 of the first cartridge 12 may also include molded ribbed facial seals.

Figure 2E:
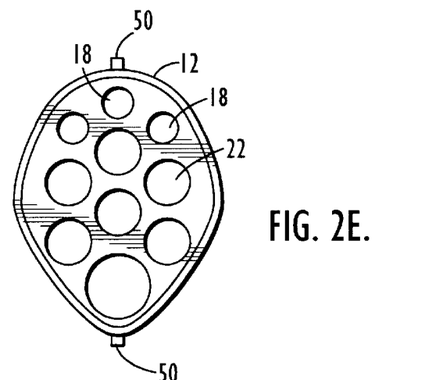

As shown in FIG. 2, the frames 15, 19 of the first and second cartridges 12, 14 preferably include corresponding tangs 50, 52 protruding from the exterior surface of the first and second cartridges and having corresponding tips 54, 56 constructed in a predetermined configuration. In an alternate embodiment, as illustrated in FIG. 2E, the tangs 50, 52 for the first and second cartridges may be provided on the top and bottom of the corresponding frames 15, 19. The tangs 50, 52 of each cartridge 12, 14 should be flexible, yet resilient and may be molded integrally as part of the corresponding frames 15, 19 of the first and second cartridges. In a preferred embodiment, the first and second cartridges also include guides 58, 60. The guides 58, 60 may also be molded as part of the corresponding frames 15, 19 of the first and second cartridges 12, 14.

Figure 6:
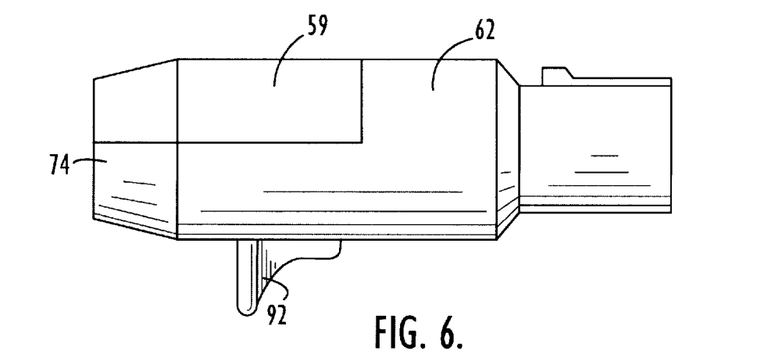
FIG. 6 is a side view illustrating an alternate embodiment of the modular connector of FIG. 2.

Referring again to FIG. 2, the modular connector 10 of one embodiment preferably includes an outer member 62 for at least partially encasing the first and second cartridges 12, 14. The outer member 62 preferably includes apertures 64, 66 having configurations corresponding to the configurations of the tips 54, 56 of the tangs 50, 52 of the first and second cartridges 12, 14, respectively, for releasably securing the first and second cartridges within the outer member. Advantageously, the first and second cartridges 12, 14 may easily be disconnected and reconnected, for example during maintenance or when replacing the first cartridge. The outer member 62 further includes guide ways 45, 49 for slidably receiving the corresponding guides 58, 60 of the first and second cartridges 12, 14. In a preferred embodiment, the first cartridge 12 further includes a flange 68 that contacts one end 70 of the outer member 62 and a tertiary seal 72, for example an o-ring, positioned adjacent to the flange. The flange 68 and the tertiary seal 72 prevent moisture and debris from entering the outer member 62 when the first cartridge 12 is secured within the outer member. As shown in FIG. 6, the outer member 62 preferably includes a detachable segment or removable door 59 proximate to the end 90 of the outer member that receives the second cartridge 14. The removable door 59 facilitates servicing of the second cartridge and the connection with first cartridge 12, as well as the wires 11 and/or optical fibers 13. The outer member 62 may also include a threaded hole (not shown) into the ground pin for attachment of the first cartridge 12 into the outer member.

As shown in FIGS. 2 and 3, the modular connector 10 preferably includes a strain-reduction member 74 for reducing the strain applied to the wires 11 and the optical fibers 13. The strain-reduction member 74 defines a central aperture 75 for receiving the conductors 11 and the optical fibers 13. The strain-reduction member 74 may be threaded at one end 76 to matingly engage the corresponding internal threaded surface of a fastening member 78, which is also part of the strain-reduction member, so that the conductors 11 and the optical fibers 13 may be secured to the first receiving end 36 of the second cartridge 14 in a manner that shields the connection from strain. However, as shown in FIG. 6, the strain-reduction member 74 may be constructed without a threaded end and used singly to secure the conductors 11 and the optical fibers 13 to the first receiving end 36 of the second cartridge 14. The strain-reduction member 74 preferably includes a tang 80 protruding from the outer surface that may be molded integrally as part of the strain-reduction member. The tang 80 includes a tip 82 configured in a predetermined shape. The tang 80 should be flexible, yet resilient. The strain-reducing member 74 may further include a guide 84 that may also be molded integrally as part of the strain-reduction member. The strain-reduction member 74 is preferably constructed of a hard durable plastic.

As shown in FIGS. 2 and 3, the strain-reduction member 74 is attached to the outer member 62. In order to assemble the modular connector 10, the conductors 11 and the optical fibers 13 are inserted through a central aperture in the fastening member 78, through the central aperture 75 of the strain-reduction member 74, and are secured to the corresponding receptors 32 of the first receiving end 36a, b of the second cartridge 14, as previously detailed above. The second cartridge 14 is inserted into the outer member 62 by aligning the guide 60 of the second cartridge with the corresponding guide way 49 of the outer member 62 and sliding the second cartridge into the outer member until the tip 56 of the tang 52 engages the corresponding aperture 66 provided in the outer member. Next, the strain-reduction member 74 is inserted into the outer member 62 by aligning the guide 84 with the corresponding guide way 49 of the outer member and sliding the strain-reduction member into the outer member until the tip 82 of the tang 80 engages the corresponding aperture 86 provided in the outer member for releasably securing the strain-reduction member. In a preferred embodiment, the fastening member 78 is then screwed onto the strain-reduction member 74 thereby causing a compressible grommet (not shown) housed within the fastening member to expand radically inward so as to secure the conductors 11 and the optical fibers 13 to the first receiving end 36 of the second cartridge. As shown in FIG. 2, in a preferred embodiment, the strain-reduction member 74 also includes a flange 88 that engages the end 90 of the outer member 62 when the strain-reduction member is secured therein to prevent debris and moisture from enter the outer member.

The first cartridge 12 can then be inserted into the outer member 62 by aligning the guide 58 of the first cartridge with the corresponding guide way 45 of the outer member and sliding the first cartridge into the outer member until the tip 54 of the tang 50 engages the corresponding aperture 64 provided in the outer member. As a result, the blade-like conductors 21 of the first cartridge can engage respective receptors 34 of the second cartridge 14 in order to establish electrical connection therebetween. In addition, the alignment of the first and second cartridges 12, 14 that occurs upon engagement of the conductors 21 of the first cartridge with the receptors 34 of the second cartridge also align the optical channels 17, 31, in any, of the first and second cartridges such that optical signals can be transmitted therethrough. Preferably, the outer member 62 can also include a trigger 92 to assist the operator with inserting and securing the first and second cartridges 12, 14, and the strain-reduction member 74 inside the outer member. Thereafter, the connector 10 can be mounted on an appropriate receptacle such that the conductive elements or pins 43 of the receptacle engage corresponding receptors 22 of the first cartridge 12. Advantageously, the first cartridge 12 can be easily and efficiently replaced in the event the receptors 22 become damaged due to frequent connection and disconnection with the conductive elements 43 of the receptacle. Notably, replacement of the first cartridge 12 does not require adjustment of the connection between the second cartridge 14 and the wires 11 and/or optical fibers 13 and, thus, reduces replacement time and avoids potential damage to the wires and/or optical fibers.

Figure 4:
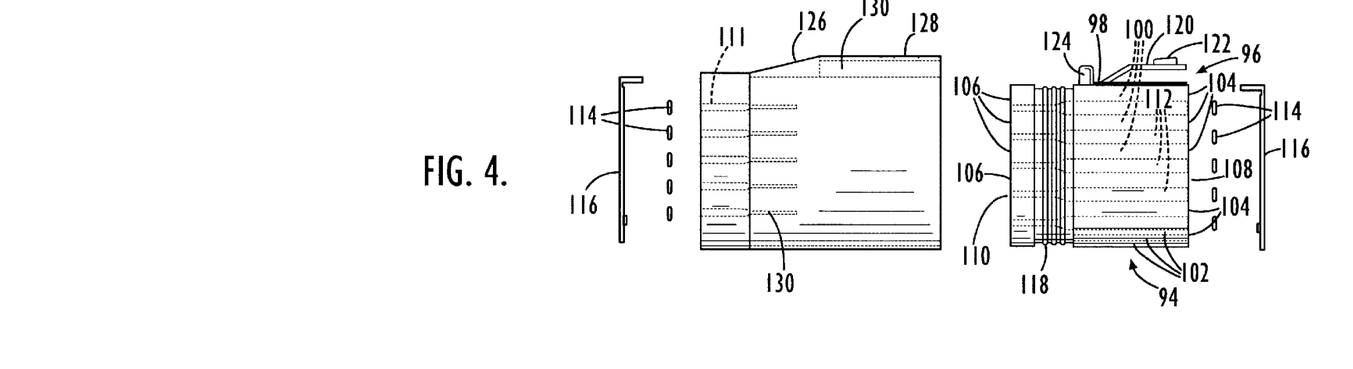
FIG. 4 is a side view illustrating an electrical and optical connector according to one embodiment of the present invention.

In an alternate embodiment, as illustrated in FIG. 4, the connector 10 can include an additional retaining member 116 that is positioned around the receptors 32 of the first receiving end 36 of the second cartridge 14, and likewise, the receptors 22 of the receiving end 26 of the first cartridge 12. The retaining member 116 can be constructed of stainless steel and provides additional stability to the receptors 22, 32 under high current and temperature conditions, and when the modular connector 10 is subjected to vibration during use. Similarly, a shroud (not shown) may be positioned around the blade-like conductors 21 of the conductor end 24 of the first cartridge 12 for protection and stability.

In an another embodiment, as illustrated in FIG. 4, the modular connector 94 includes only one cartridge 96. The cartridge 96 includes a frame 98, a plurality of conductive terminals 100 and a plurality of optical channels 102 extending the length of the cartridge. The frame may be molded of a hard durable plastic. As with the frame 19 of the second cartridge 14, the frame 98 of the cartridge 96 is preferably constructed of material having a durometer equivalent to hard rubber so that the conductive terminals 100 and optical channels 102 can be insert molded. In one preferred embodiment, the frame 98 is constructed of an optically transmissive material. For example, the frame 98 may be formed of a material selected from the group consisting of a translucent material and a transparent material, such as clear polycarbonate or another optically transmissive plastic or glass, to enable an optical signal to be transmitted through the optically transmissive frame of the cartridge 96.

Each conductive terminal 100 includes a corresponding pair of receptors 104, 106 disposed at opposite receiving ends 108, 110 of the cartridge. Each of the receptors 104 of the first receiving end 108 are configured to securely receive the terminal end of a corresponding wire. Each of the receptors 106 of the second receiving end 110 may also be configured to securely receive the terminal end of a corresponding conductor 111, thereby creating a coupling terminal between one or more corresponding pairs of wires and conductors. The corresponding receptors 104, 106 of the first and second receiving ends 108, 110 are in electrical communication through the portions of the conductive terminal 100 that extends between the corresponding receptors 104, 106. Each receptor 104, 106 of the first and second receiving ends 108, 110 is can be configured to have a cross-sectional shape of a circle or ellipse. The receptors 104, 106 may be constructed of brass or another conducting material and may be split to allow for expansion. The receptors 104, 106 may be cryogenically tempered to improve the durability of the receptors.

As shown in FIG. 4, the optical channels 102 of the cartridge 96 preferably include optically transmissive tubes or fibers constructed of a clear polycarbonate or other optically transmissive plastic or glass. In addition or instead of optically transmissive tubes or fibers, the optical channels 102 can include one or more lens (not shown) for focusing and transmitting the optical signals from the first receiving end 108 of the cartridge 96 to the second receiving end 110. Alternatively, in embodiments in which the frame 98 of the cartridge 96 is formed of an optically transmissive material, the frame itself can serve as the optical channel through which optical signals are transmitted.

As previously discussed, the wires 11 are secured within the corresponding receptors 104, 106 by first positioning a primary seal 114, such as a Packard® cable seal, around the terminal end of each of the one or more wires and pressure crimping the primary seal around each wired. Next, the terminal end of each of the wires is positioned within the corresponding receptor 104 of the first receiving end 108 of the cartridge 96 and the receptor is permanently crimped around the corresponding wire. The optical fibers 13 are similarly secured within the optical channels 102 of the first receiving end 108 of the cartridge 96, as is known in the art.

In an alternate embodiment, each of the wires 11 and/or optical fiber 13 is inserted through a slot in a comb-like locking member 116, such as a Packard® secondary, prior to positioning and crimping the corresponding primary seal 114. Once each of the receptors 104 of the first receiving end 108 of the cartridge 96 are permanently crimped around the terminal ends of the corresponding wires 11 and/or the optical fibers 13 are secured and the primary seals 114 have been mounted upon the wires and/or optical fibers, the locking members 116 are slid along the wires and/or optical fibers to a position adjacent the first receiving end 108 of the cartridge 96 and rearward of the primary seals 114. The locking member 116 stabilizes the receptors 104 under high current and temperature, and during extreme vibration, as well as urges the wires 11 and/or optical fibers 13 towards the first receiving end 108 of the cartridge 96. In a preferred embodiment, the locking member 116 is constructed of stainless steel, however, the locking members may be constructed of any material having relatively high strength and stiffness.

As shown in FIG. 4, the second receiving end 110 of the cartridge 96 preferably includes a secondary seal 118. In a preferred embodiment, the secondary seal 118 is highly durable multi-ribbed nose seal, such as a Packard® connector seal, that may be molded to the frame 98 of the cartridge 96. The secondary seal 118 may contain a small notch in the base of the seal to allow the cartridge 96 to drain and breathe.

As shown in FIG. 4, the frame 98 of the cartridge 96 preferably includes a tang 120 protruding from the outer surface of the cartridge and having a corresponding tip 122 constructed in a predetermined configuration. The tang 120 should be flexible, yet resilient and may be molded as part of the frame of the mating member. In a preferred embodiment, the cartridge 96 includes a guide 124 that may also be molded as part of the corresponding frame 98 of the cartridge.

As shown in FIG. 4, the modular connector 94 preferably includes an outer member 126 for at least partially encasing the cartridge 96. The outer member 126 preferably includes an aperture 128 having a configuration corresponding to the configuration of the tip 122 of the tang 120 of the cartridge 96 for releasably securing the cartridge within the outer member. Advantageously, the cartridge 96 may easily be disconnected and reconnected, for example during periodic maintenance. The outer member 126 further includes a guide way 130 for slidably receiving the corresponding guide 124 of the cartridge 96.

Figure 5:
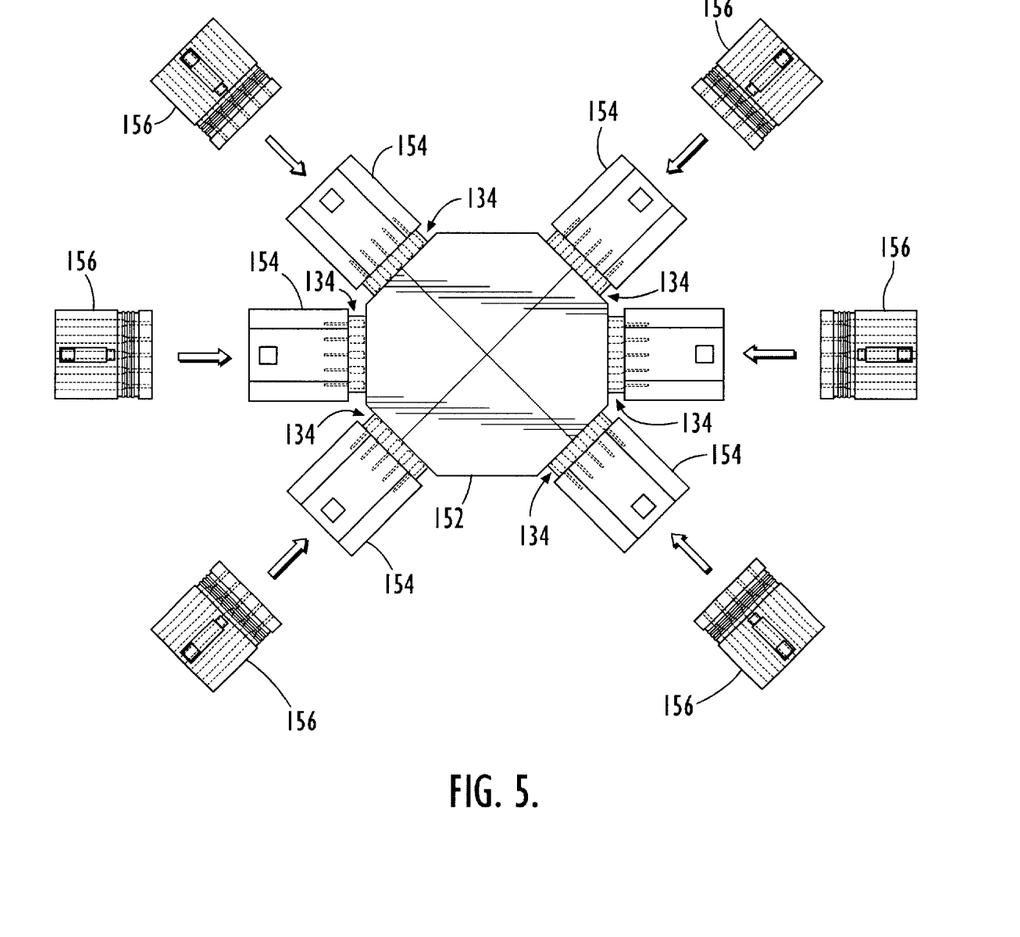
FIG. 5 is a plan view illustrating an electrical and optical junction box according to the present invention.

As shown in FIG. 4, the connector 94 can be configured such that the receptors 106 of the second receiving end 110 of the cartridge 136 are configured to receive corresponding bladed conductors 132. As shown in FIG. 5, two or more connectors 134 may be assembled to form a junction box 152. In this embodiment, each connector includes an outer member 154 for releasably securing a corresponding cartridge 156 that may be secured directly to or molded integrally with the frame of the junction box.

In the preferred embodiments detailed above, the modular connectors have been described as containing both electronically conductive elements and optically transmissive elements for reliably conducting and transmitting electrical and optical signals, respectively. However, the modular connectors constructed according to the present invention may be constructed, as described above, for use with only electrical communicating members, or alternatively, for use with only optical communicating members. In any event, the replaceable first cartridge enables efficient repair and servicing of the modular connector without affecting the connections between the second cartridge and the electrical communicating member and/or the optical communicating member. As such, the wear and tear that occurs as the connector of the present invention is repeatedly connected and disconnected can be eliminated by periodically replacing the first cartridge, which is the cartridge that directly mates with the receptacle. Since the second cartridge, but not the first cartridge, is directly connected to the communicating members, such as the wires and/or optical fibers, the first cartridge can be easily replaced without disrupting or having to reconnect the communicating members. Since the connector is modular, the connector can easily adapt to a variety of other applications as described hereinafter.

While particular embodiments of the invention have been described, it will be understood, of course, the invention is not limited thereto since modifications may be made by those skilled in the art, particularly in light of the foregoing teachings. It is therefore, contemplated by the appended claims to cover any such modifications that incorporate those features of these improvements in the true spirit and scope of the invention.

That which is claimed:

1. A connector for providing electrical and optical signals to a receptacle, the connector comprising:
   a cartridge comprising:
      at least one conductive terminal having first and second receptors, the first receptor of said at least one conductive terminal adapted to receive an electrical communicating member, the second receptor of said at least one conductive terminal being in electrical communication with a conductive element of the receptacle;
      an optically transmissive frame comprised of a material selected from a group consisting of a translucent material and a transparent material such that an optical signal can be transmitted through said optically transmissive frame to the receptacle, said optically transmissive frame having first and second ends, the first end of said optically transmissive frame adapted to receive an optical communicating member; and
      an outer member having first and second ends and defining an opening therethrough, said outer member at least partially encasing said cartridge.

2. A connector according to claim 1 further comprising at least one cable seal adapted to sealably engage the first receptor of said at least one conductive terminal.

3. A connector according to claim 1 further comprising a locking member for securing an electrical communicating member to the first receptor of said at least one conductive terminal and an optical communicating member to the first end of said optically transmissive frame.

4. A connector according to claim 1 further comprising a multi-ribbed seal adapted to sealably engage at least a portion of an exterior surface of said cartridge and an interior surface of said outer member.

5. A connector according to claim 1 wherein said second receptor of said at least one conductive terminal is cryogenically tempered.

6. A modular connector for connecting a communication member to a receptacle, the modular connector comprising:
   a replaceable first cartridge comprising at least one communication terminal having opposed ends, wherein the first end of said at least one communication terminal of said replaceable first cartridge is adapted to transmit a communication signal to the receptacle, said replaceable first cartridge being adapted to be selectively mated and demated with the receptacle; and
   a second cartridge having at least one communication terminal defining first and second receptors, the first receptor of said at least one communication terminal of said second cartridge adapted to receive the communication member, the second receptor of said at least one communication terminal of said second cartridge adapted to releasably engage the second end of said at least one communication terminal of said replaceable first cartridge, said first and second cartridges adapted to be selectively mated and demated so that said replaceable first cartridge can be replaced.

7. A modular connector according to claim 6 further comprising at least one cable seal adapted to sealably engage the first receptor of said at least one communication terminal of said second cartridge.

8. A modular connector according to claim 6 wherein said replaceable first cartridge and said second cartridge further comprise optically transmissive frames comprised of a material selected from a group consisting of a translucent material and a transparent material such that an optical signal can be transmitted through said optically transmissive frames of said replaceable first cartridge and said second cartridge to the receptacle.

9. A modular connector according to claim 6 further comprising a locking member for securing a communication member to the first receptor of said at least one communication terminal of said second cartridge.

10. A modular connector according to claim 6 wherein said at least one communication terminal of said replaceable first cartridge and said at least one communication terminal of said second cartridge are electrically conductive.

11. A modular connector according to claim 6 wherein said at least one communication terminal of said replaceable first cartridge and said at least one communication terminal of said second cartridge are optically transmissive.

12. A connector according to claim 6 wherein the first end of said at least one conductive terminal of said replaceable first cartridge is cryogenically tempered.

13. A modular connector according to claim 6 further comprising an outer member having first and second ends and defining an opening therethrough, the first end of said outer member adapted to receive at least a portion of said second cartridge, the second end of said outer member adapted to releasably receive at least a portion of said replaceable first cartridge so that said replaceable first cartridge can be replaced.

14. A modular connector according to claim 13 further comprising at least one multi-ribbed seal adapted to sealably engage at least a portion of an exterior surface of said replaceable first cartridge and an interior surface of said outer member.

15. A modular connector according to claim 13 further comprising at least one multi-ribbed seal adapted to sealably engage at least a portion of an exterior surface of said second cartridge and an interior surface of said outer member.

16. A modular connector according to claim 13 further comprising a strain-reduction member removably attached to said outer member, said strain-reduction member defining an opening therethrough adapted to receive and urge the communication member toward said at least one communication terminal of said second cartridge.

17. A modular connector according to claim 13 wherein said housing has a removable door for servicing said at least one communication terminal of said second cartridge.

18. A modular connector comprising:
  a replaceable first cartridge that is adapted to be selectively mated and demated with a receptacle, comprising:
    at least one conductive terminal defining opposed ends, wherein the first end of said at least one conductive terminal of said replaceable first cartridge is adapted to transmit an electrical signal to the receptacle; and
    at least one optical channel defining opposed ends, wherein the first end of said at least one optical channel of said replaceable first cartridge is adapted to transmit an optical signal to the receptacle; and a second cartridge comprising:
    at least one conductive terminal defining first and second receptors, the first receptor of said at least one conductive terminal of said second cartridge adapted to receive an electrical communicating member, the second receptor of said at least one conductive terminal of said second cartridge being in electrical communication with the second end of said at least one conductive terminal of said replaceable first cartridge; and
    at least one optical channel defining opposed receiving and transmitting ends, the receiving end of said at least one optical channel adapted to receive optical signals from an optical communicating member, the transmitting end of said at least one optical channel adapted to transmit an optical signal to the second end of said at least one optical channel of said replaceable first cartridge; and
    wherein, said first and second cartridges are adapted to be selectively mated and demated so that said replaceable first cartridge can be replaced.

19. A modular connector according to claim 18 further comprising at least one cable seal adapted to sealably engage the first receptor of said at least one conductive terminal of said second cartridge.

20. A modular connector according to claim 18 further comprising a housing for at least partially housing said replaceable first cartridge and said second cartridge.

21. A modular connector according to claim 20 wherein said housing has a removable door for servicing said at least one conductive terminal and said at least one optical channel of said second cartridge.

22. A modular connector according to claim 20 further comprising at least one multi-ribbed seal adapted to sealably engage at least a portion of an exterior surface of said replaceable first cartridge and at least a portion of an interior surface of said housing.

23. A modular connector according to claim 20 further comprising at least one multi-ribbed seal adapted to sealably engage at least a portion of an exterior surface of said second cartridge and at least a portion of an interior surface of said housing.

24. A modular connector according to claim 20 further comprising a strain-reduction member removably attached to said housing, said strain-reduction member defining an opening therethrough adapted to receive and urge the electrical and optical communicating members toward the first receptor of said at least one conductive terminal and the receiving end of said at least one optical channel of said second cartridge.

25. A modular connector according to claim 18 further comprising a locking member for securing the electrical communicating members to the first receptor of said at least one conductive terminal of said second cartridge and securing the optical communicating members to the receiving end of said at least one optical channel of said second cartridge.

26. A modular connector according to claim 18 wherein the first end of said at least one conductive terminal of said replaceable first cartridge is cryogenically tempered.

27. A modular connector comprising:
  a replaceable first cartridge having at least one conductive terminal defining opposed ends, wherein the first end of said at least one conductive terminal of said replaceable first cartridge is adapted to conduct an electrical signal to a receptacle;
  a second cartridge having at least one conductive terminal defining first and second receptors, the first receptor of said at least one conductive terminal of said second cartridge adapted to receive an electrical communicating member, the second receptor of said at least one conductive terminal of said second cartridge being in electrical communication with the second end of said at least one conductive terminal of said replaceable first cartridge; and
  wherein, said first and second cartridges comprise optically transmissive frames comprised of a material selected from a group consisting of a translucent material or a transparent material such that an optical signal can be transmitted through said optically transmissive frames of said second cartridge and said replaceable first cartridge to the receptacle, said first and second cartridges being adapted to be selectively mated and demated so that said replaceable first cartridge can be replaced.

28. A modular connector according to claim 27 further comprising at least one cable seal adapted to sealably engage the first receptor of said at least one conductive terminal of said second cartridge.

29. A modular connector according to claim 27 further comprising a housing for at least partially housing said replaceable first cartridge and said second cartridge.

30. A modular connector according to claim 29 wherein said housing has a removable door for servicing said at least one conductive terminal and said at least one optical channel of said second cartridge.

31. A modular connector according to claim 29 further comprising at least one multi-ribbed seal adapted to sealably engage at least a portion of an exterior surface of said replaceable first cartridge and at least a portion of an interior surface of said housing.

32. A modular connector according to claim 29 further comprising at least one multi-ribbed seal adapted to sealably engage at least a portion of an exterior surface of said second cartridge and at least a portion of an interior surface of said housing.

33. A modular connector according to claim 29 further comprising a strain-reduction member removably attached to said housing, said strain-reduction member defining an opening therethrough adapted to receive and urge the electrical and optical communicating members toward the first receptor of said at least one conductive terminal and the receiving end of said at least one optical channel of said second cartridge.

34. A modular connector according to claim 27 further comprising a locking member for securing the electrical communicating member to the first receptor of said at least one conductive terminal of said second cartridge and securing the optical communicating member to the receiving end of said at least one optical channel of said second cartridge.

35. A modular connector according to claim 27 wherein the first end of said at least one conductive terminal of said replaceable first cartridge is cryogenically tempered.

* * * * *